United States Patent
Das et al.

(10) Patent No.: US 12,454,498 B2
(45) Date of Patent: Oct. 28, 2025

(54) PROCESS AND CATALYST SYSTEM FOR CONVERSION OF C6 AROMATICS TO HIGHER AROMATICS

(71) Applicant: INDIAN OIL CORPORATION LIMITED, Maharashtra (IN)

(72) Inventors: Nayan Das, Faridabad (IN); Mainak Sarkar, Faridabad (IN); Ganesh Vitthalrao Butley, Faridabad (IN); Kalicharan Chattopadhyay, Faridabad (IN); Sarvesh Kumar, Faridabad (IN); Madhusudan Sau, Faridabad (IN)

(73) Assignee: INDIAN OIL CORPORATION LIMITED (IN)

( * ) Notice: Subject to any disclaimer, the term of this patent is extended or adjusted under 35 U.S.C. 154(b) by 342 days.

(21) Appl. No.: 18/133,953

(22) Filed: Apr. 12, 2023

(65) Prior Publication Data

US 2023/0331645 A1     Oct. 19, 2023

(30) Foreign Application Priority Data

Apr. 14, 2022    (IN) .............. 202221022314

(51) Int. Cl.

| | |
|---|---|
| *C07C 2/66* | (2006.01) |
| *B01J 21/04* | (2006.01) |
| *B01J 29/16* | (2006.01) |
| *C07C 2/48* | (2006.01) |
| *C07C 2/86* | (2006.01) |
| *C10G 49/04* | (2006.01) |

(52) U.S. Cl.
CPC .............. *C07C 2/864* (2013.01); *B01J 21/04* (2013.01); *B01J 29/166* (2013.01); *C07C 2/48* (2013.01); *C10G 49/04* (2013.01); *C07C 2529/14* (2013.01); *C07C 2529/16* (2013.01)

(58) Field of Classification Search
CPC .... C07C 2/02; C07C 2/66; C07C 2/70; C07C 2/864; C07C 2529/14; C07C 2529/16; B01J 21/04; B01J 29/166; B01J 23/85; B01J 37/20; C10G 29/205
See application file for complete search history.

(56) References Cited

U.S. PATENT DOCUMENTS

| | | | |
|---|---|---|---|
| 6,093,866 A * | 7/2000 | Wang ........................ | C07C 2/66 585/446 |
| 7,453,018 B2 | 11/2008 | Dakka et al. | |
| 7,799,962 B2 | 9/2010 | Dakka et al. | |
| 8,937,205 B2 | 1/2015 | Iaccino et al. | |
| 2011/0306809 A1* | 12/2011 | Nicholas ................... | C07C 2/66 585/323 |

OTHER PUBLICATIONS

Yuan et al., "Alkylation of benzene with ethanol over ZSM-5 catalyst with different SiO2/Al2O3 ratios", Indian Journal of Chemical Technology, vol. 11, pp. 337-345, May 2004.

* cited by examiner

*Primary Examiner* — In Suk C Bullock
*Assistant Examiner* — Jason Y Chong

(57) ABSTRACT

A process for the upgrading of hydrocarbon streams, i.e., processing any hydrocarbon feed streams rich in benzene and sulphur compounds. The process for simultaneous hydrodesulfurization and benzene conversion to higher alkylated aromatic molecules ($C_7$ to $C_{10}$ aromatics), without need of prior treatment like distillation, or sulfur removal. The hydrocarbon feed streams are processed over sulfided metal catalyst impregnated on acid support simultaneously desulfurizes and alkylates the benzene molecules.

17 Claims, 1 Drawing Sheet

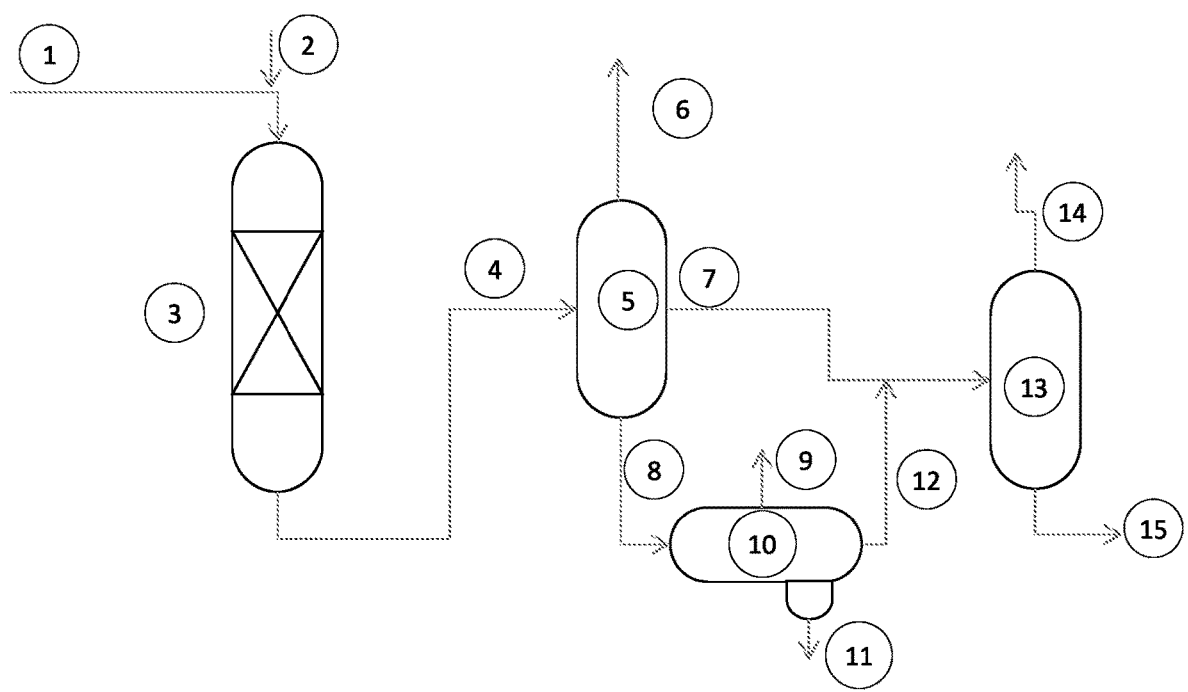

PROCESS AND CATALYST SYSTEM FOR CONVERSION OF C6 AROMATICS TO HIGHER AROMATICS

FIELD OF THE INVENTION

This invention relates to a process for the upgrading of hydrocarbon streams. More particularly it relates to a process for simultaneous hydrodesulfurization and benzene conversion, i.e., direct conversion of feed stream to alkylated benzenes, without need of prior treatment like distillation, or sulfur removal.

BACKGROUND OF THE INVENTION

Benzene is a natural occurring petrochemical building block found in crude oil as well as in coal distillates. Apart from its natural sources, benzene molecules are also formed in various refinery processes. The environmental norms across the globe are getting stringent every day, with this the use of benzene is also getting restricted because of its carcinogenicity. Despite having very high-octane number, the benzene concentration in gasoline is still limited to only 1 Vol % in most of the countries including India. Because of the health-related issues, the use of benzene in most industrial applications have been also restricted.

Although, benzene is considered as the building block of petrochemicals, however, benzene itself has very limited use as raw material in production of petrochemicals; rather its derivatives viz. Phenol, aniline, benzoic acid, etc. have more application. Therefore, converting benzene to its derivatives or alkylating it to toluene, ethylbenzene, xylenes, etc. is much more beneficial as these compounds find more applications for producing $2^{nd}$ or $3^{rd}$ generation petrochemicals.

Crude oil refineries consist of various primary and secondary processing units. In modern refineries, the main contributors of benzene in gasoline pool are primarily catalytic reformer (CCRU) and catalytic cracking (FCC) processes. The typical sources of benzene contributor in gasoline pool are given in the table below:

| Process stream | Benzene concentration (vol %) | Benzene contribution to Gasoline pool (%) | Stream contribution in Gasoline pool (%) |
|---|---|---|---|
| Reformate | 0.2-8 | 75-80 | 40-45 |
| FCC Naphtha | 0.5-2 | 10-15 | 35-40 |
| Coker Naphtha | 0.5-1 | 2-5 | 2.5-6 |
| Light St. Run Naphtha (C5-100° C.) | 0.8-8 | 2-5 | 2.5-6 |
| VGO hydrocracker Naphtha (C5-160° C.) | 1-5 | 1-5 | 3-8 |

The options for Gasoline pool benzene management in refineries known in the art includes:

(i) Fractionation of feedstock for catalytic reforming or reformate. In most of refineries, the $C_6$ fraction is eliminated from the feed stream catalytic reforming unit in order to avoid a partial transformation into benzene. During the reforming process, the whole cyclohexane, 50% of methyl cyclopentane and about 20% paraffin present in $C_6$ fraction are converted to benzene. The refineries which are integrated with petrochemical complex are choosing to separate the benzene fraction through fractionation followed by benzene recovery through extraction and finally use it as a feedstock for petrochemical industry.

(ii) Saturating the benzene fraction itself or combining with hydro isomerization and alkylation or the benzene extraction. Many refineries have chosen to install facilities for benzene hydrogenation out of the benzene rich fraction from reformate. Benzene removal out of the gasoline leads to a significant loss of RON, which makes it necessary to reformulate the commercial gasoline, using oxygenated compounds or using octane compounds out of the isomerization and alkylation processes.

(iii) Process severity reduction in the catalytic reforming associated with utilization of benzene low selectivity catalysts can be a cheap solution which allows to diminish the benzene content.

Research Octane Number (RON) is one of the important parameters for gasoline fuel. Higher the RON, better is the anti-knocking characteristics of the fuel. The RON of Benzene is 101 units. Hence, as mentioned, either removal or restricting formation of benzene from any refinery stream or process (viz. CCRU) causes significant loss in RON. This loss is usually compensated with other product streams viz. oxygenates, isomerates and alkylates.

However, on careful analysis of the situation it is realized that this approach of benzene management is somehow exasperation. On rational analysis, it is clearly understood that the current strategy for benzene management can be eliminated with a single affordable technology i.e., conversion of benzene to higher alkylated aromatics viz. $C_7$, $C_8$ and $C_9$ aromatics. For understanding the need of present innovation, it is pertinent to understand that the RON of alkylated benzene increases significantly compared to benzene itself. To justify this statement, the RON values of few alkylated benzenes are given below:

| Compound | RON Value |
|---|---|
| Toluene | 121 |
| Ethyl benzene | 112 |
| Mixed Xylene | 118 |
| i-propyl benzene | 112 |

If this is the fact, then why the refiners are following so cumbersome and costly methodology for benzene management? One direct answer to this question is non-availability of any such affordable technology which can convert benzene to alkylated aromatics in presence of other components particularly hetero-atoms viz. sulphur, nitrogen, etc.

Another argument on this topic may be regarding statutory limitation of aromatics in the gasoline pool. If the benzene is converted to alkylated benzene the aromatic concentration in gasoline pool may exceed beyond the limit. However, this should not be an issue since, this can be adjusted with other aromatic free refinery streams like oxygenates, isomerates and alkylates. With this approach, the aromatic concentration in gasoline pool will be within the statutory limit and the RON will also be much higher compared to present approach. Therefore, there is dire need of the technology which will be able to convert benzenes to alkylated benzenes.

Alkylation of benzene was commercially used in 1930s to produce ethylbenzene, a chemical intermediate to produce styrene. The process reaction was a liquid phase Friedel Craft alkylation reaction using ethylene. Aluminum based catalyst (AlCl$_3$) and alumina supported phosphoric acid was used as catalyst in those processes. However, the process has serious disadvantage over the disposal of the catalyst. The catalyst is highly corrosive, and formation of by-products which are highly toxic for the environment. In case of phosphoric acid, the recycling process is cumbersome and complex arrangement was required.

In view of the above problems, zeolite-based gas phase reaction process has evolved over the time. However, in all these above-mentioned commercial processes, the disadvantage lies in the cost involved. Ethylene used in the process itself has a high market value. Therefore, alternative options have been explored and it has been found that biomass derived ethanol can be a cheaper option for the alkylation operation. In the same way, methanol can also be used as alkylating reagent and can be used for converting benzene rich stream of the refinery to a lower benzene rich stream.

The processes patented and developed so far within the gambit of benzene alkylation are targeted towards production of some compound or class of compounds. While developing such processes the aim of inventors/process developers were focused on feedstock purity, product yield, selectivity, product purification and therefore manipulated the process conditions accordingly. It is well known in the art that whatever be the source of benzene, there is no doubt on the fact that everyone considered pure benzene stream, may not be 100% but still at least to an economic level i.e., more than 90-95. Further, it is also apparent that the feed benzene stream considered for alkylation process is free from hetero atoms such as sulphur, nitrogen, etc. Regarding the alkylating agent (electrophile generating agent), viz. ethylene, methanol, ethanol, etc. it is obvious that it should be also pure at least up to the extent of purification level that can be achieved economically. Hence, it is very much clear that there is no current process technology available for processing raw refinery streams containing significant low concentration of benzene (8-10 vol % max), along with other impurities like sulphur, nitrogen, etc.

The literatures on benzene alkylation indicate that the catalyst system for the process have evolved from Al-based catalyst system to zeolite-based catalyst system and the liquid phase reactions have been advanced to gas phase reaction with certain benefits.

U.S. Pat. No. 7,799,962B2 discloses that for alkylation reaction hydrogenation metals are required for incorporating hydrogenation function to the catalyst system. The patent discloses that the metal in the zeolite can be introduced by any technique known in the art such as impregnation or ion exchange. The hydrogenation metals useful in accordance with this invention encompass metals in elemental state or other form such as oxide, sulfide, halide, carboxylate, etc. While in the same patent the inventors clearly mentioned their preference for zero valent metal from the groups of VIIIA (i.e., Pt, Pd, Ir, Rh, Os, Ru, Ni, Co, and Fe), IVB (i.e., Sn and Pb), VB (i.e., Sn and Pb), and VIIA (i.e., Mn, Tc and Re). Further, in the same patent, the inventors showed their clear preference on Noble metals (i.e., Pt, Pd, Ir, Rh, Os and Ru) and particularly on Rh. The patent discloses the alkylation reaction condition as temperature between 400-700° C., reactant pressure between 1 and 50 psig (0.07-3.5 kg/cm$^2$g), weight hourly space velocity between 6-12 h$^{-1}$ and H$_2$ partial pressure at least 5 psig (0.35 kg/cm$^2$g). The patent further discloses that the molar ratio of toluene and benzene to alkylating agent can vary between 2:1 and 4:1. The conversion is between 30% and p-xylene selectivity 30%. No information on feed contaminant is provided in this patent. The example clearly indicates Pt based catalyst system and operating condition is within the operating window mentioned above.

Similar references (U.S. Pat. No. 7,453,018 B2 and U.S. Pat. No. 8,937,205 B2) are also available where different form of molecular sieve i.e., zeolite, particularly ZSM 5 have been used for alkylation of benzene and toluene using methanol or ethanol as alkylating agent.

Yuan et al. in their publication [Indian Journal of Chemical Technology, Vol. 11, May 2004, pp 337-345] investigated the alkylation process of benzene with ethanol over ZSM-5 catalyst with different SiO$_2$/Al$_2$O ratio. They disclosed in their publication that the conversion of benzene is ~59 wt % with an ethylbenzene selectivity of around 80 wt %. The temperature and pressure required to achieve the desired conversion is around 400° C. and 1 bar g.

One of the common factors between the U.S. Pat. No. 7,799,962B2, U.S. Pat. No. 7,453,018B2 and U.S. Pat. No. 8,937,205B2 is that the process and catalyst system have been developed for production p-xylene. Accordingly, all the processes utilize noble metal based (zero valent) zeolite catalyst system. Although all metal forms i.e., oxide, sulfide, halide, carboxylate, etc. have been discussed in the inventions, it is well known in the art that heteroatoms or the contaminants such as sulfur & nitrogen compounds are poisonous to these noble metal catalysts resulting to their rapid deactivation. Another drawback of the prior arts related to alkylation process are that all the processes are low pressure with distinctive disadvantages related to catalyst stability and coke formation. Further, the conversion in all these processes is low.

Based on the above discussions it is obvious that, improvement in current benzene management practices in refinery is very much required, because there is no direct and robust process technology available for conversion of benzene molecules available in the refinery streams to alkylated benzenes for meeting gasoline pool benzene specifications as well as for production of petrochemicals. If some refiner wants to implement the benzene alkylation process, they need an elaborate infrastructure starting from benzene isolation, benzene concentration, and purification along with available alkylation process technology. Hence, the benzene alkylation technologies can only be implemented for some targeted special products or product groups for which the process economics can be justified. Considering the above drawbacks of benzene alkylation process technology, a benzene conversion (alkylation) process has been disclosed in this patent.

SUMMARY OF THE INVENTION

The present invention provides a process for controlling the percentage of benzene in hydrocarbon feed streams, said process being integrated to known process for processing the hydrocarbon feed streams and comprises converting benzene molecules into higher alkylated aromatic molecules by routing hydrocarbon feed streams with alkylating agent, sulfiding agent, and hydrogen gas to a fixed bed catalytic reactor to pass over the catalyst In one of the aspect of the process for controlling the percentage of benzene, the pre-process benzene content in the hydrocarbon feed streams is ≥5 vol %.

In one of the aspect of the process for controlling the percentage of benzene, the process is independent of sulphur or H$_2$S content in the hydrocarbon feed streams.

In another aspect of the process for controlling the percentage of benzene, the process is simultaneously accompanied with hydrodesulfurization In another aspect of the process for controlling the percentage of benzene, the fixed bed catalytic reactor is selected from fixed bed plug flow reactor, continuous stirred tank reactor, batch reactor or semi batch reactor.

In yet another aspect of the process for controlling the percentage of benzene, the weighted average bed temperature (WABT) of catalyst bed is 350-500° C., preferably 350-450° C., and most preferably 380-430° C.

In another aspect of the process for controlling the percentage of benzene, the catalytic reactor is maintained at an hydrogen partial pressure of 15-100 $kg/cm^2g$, preferably 25-75 $kg/cm^2g$ and most preferably 40-65 $kg/cm^2g$; and hydrogen to hydrocarbon ratio ($H_2/HC$) is in the range of 300-1500 $Nm^3/m^3$, and preferably 600-1000 $Nm^3/m^3$. The process as claimed in claim 1, wherein the catalyst comprises of 15-25 wt % of metal of group VIB, and 4-7 wt % of metals of group VIIIB.

In another aspect of the process for controlling the percentage of benzene, the catalyst is dual functional catalyst with acidic and hydrogenation-dehydrogenation function, wherein the acidic function is imparted by virtue zeolite support and the hydrogenation-dehydrogenation function is imparted by metals selected from the group VIB and group VIIIB.

In yet another aspect of the process for controlling the percentage of benzene, the catalyst comprises of: a) a carrier comprising of Y-zeolite; b) a binder comprising of alumina; c) metals selected from the group VIB and VIIIB; and d) an additive containing nitrogen and oxygen.

In another aspect of the process for controlling the percentage of benzene, the catalyst comprises of: a) a carrier comprising of Y-zeolite; b) a binder comprising of alumina; c) metals selected from the group VIB and VIIIB; and d) an additive containing nitrogen and oxygen.

In another aspect of the process for controlling the percentage of benzene, the alkylating agent are selected from the group comprising of olefins, alkyl-electrophiles generating agent from the functional group of hydroxyls, halides, thiols, oxy; and sulfiding agent is selected from H2S, Dimethyl Disulfide (DMDS); and the alkylating agent are generated in-situ using compound(s) that may react within the reactor system to generate alkyl-electrophiles.

In another aspect of the process for controlling the percentage of benzene, the wherein the hydrocarbon feed stream is not desulfurized; and nitrogen content is below 20 ppmw.

In another aspect of the process for controlling the percentage of benzene, the RON of product stream is at least 2 units more than the feed stream; and benzene content is ≤1 vol % and preferably ≤0.5 vol %.

In another aspect the present invention relates to a process for controlling the percentage of benzene in hydrocarbon feed streams comprises converting benzene molecules into higher alkylated aromatic molecules by:
  a. routing hydrocarbon feed streams with alkylating agent, sulfiding agent, and hydrogen gas to a fixed bed catalytic reactor to pass over the catalyst;
  b. routing reactor effluent to a high-pressure separator (HPS) (5), the water settled at the bottom is routed to cold high-pressure Separator (CHPS) (10);
  c. routing effluent hydrocarbon from HPS to a low-pressure separator (LPS) (13),
  d. routing and mixing condensed hydrocarbons of CHPS (10) with effluent hydrocarbon from HPS (5) to LPS (13); and
  e. separating water from CHPS (10) and obtaining the product.

In another aspect the process for controlling the percentage of benzene, the unutilized hydrogen gas is separated in HPS and removed through line 6 and recycled back; and off gas is separated in LPS, removed through line 14, and through line-9 from the CHPS.

Objectives of the Invention

It is the primary objective of the present invention is to provide a process for controlling the percentage of benzene in hydrocarbon feed streams.

It is further objective of the present invention to provide a process which can be integrated to any known process for processing the hydrocarbon feed streams.

It is further objective of the present invention to provide a process for converting benzene molecules into higher alkylated aromatic molecules.

It is further objective of the present invention is to provide a process for simultaneous hydrodesulfurization and benzene conversion, i.e., direct conversion of feed stream to alkylated benzenes, without need of prior treatment like distillation, or sulfur removal.

BRIEF DESCRIPTION OF THE DRAWING

To further clarify advantages and aspects of the invention, a more particular description of the invention will be rendered by reference to specific embodiments thereof, which is illustrated in the appended drawing(s). It is appreciated that the drawing(s) of the present invention depicts only typical embodiments of the invention and are therefore not to be considered limiting of its scope.

FIG. 1: illustrates schematic diagram of process flow scheme of the present invention.

DETAILED DESCRIPTION OF THE INVENTION

For promoting and understanding of the principles covered by present invention, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

The main embodiment of the present invention provides a process for conversion of benzene molecules available in any refinery stream to alkylated benzene molecules thereby reducing the concentration of benzene in the stream without much alteration in the total aromatic content of that stream.

Any hydrocarbon feed stream containing benzene molecules along with alkylating agent, sulfiding agent, and hydrogen gas are feed to a fixed bed catalytic reactor. These streams can be selected from the streams forming part of the gasoline pool, such as FCC gasolines, coker gasolines, reformates, straight run naphtha's, hydrocracker naphtha's, etc. The streams going to gasoline pool have benzene concentration up to 8 vol % as in reformates or can be in the range 0.5 to 2 vol % as in FCC and coker gasolines or can be 0.8 to 8 vol % as in straight run naphtha or in the range of 1 to 5 vol % as in the hydrocracker naphtha.

The benzene concentration in the total gasoline pool is to be maintained below 1 vol %, therefore, the feed streams need to be processed to reduce their benzene concentrations. Alternatively, there are many feed streams which are being sent to aromatics maximization or petrochemicals production. These feed streams may contain benzene concentration as low as 30 wt % along with other aromatic compounds. It is preferable to reduce the benzene concentrations in these feed streams going for petrochemicals production, but not by saturating them but it is desirable to alkylate them.

In one of the embodiment the present invention, the feed stream is any hydrocarbon stream generated through any refinery processes with boiling range $C_5$-210° C., preferably $C_5$ to 160° C. and most preferably $C_5$ to 95° C.

In another embodiment of the present invention, the benzene concentration in feed stream should be at least 5 vol % and preferably more than 5 vol %.

In yet another embodiment of present invention, the $C_6$ fraction is used as feed stream. Further, the process has no limitation with respect to maximum benzene concentration of the feed stream.

In another embodiment of the present invention, the feed stream along with alkylating agent and hydrogen is passed over catalyst system present in a catalytic reactor. The catalytic reactor is selected from fixed bed plug flow reactor, continuous stirred tank reactor, batch reactor or semi batch reactor. In one of the embodiment the fixed bed catalytic reactor is a fixed bed plug plow reactor (PFR). The reactor and the catalyst system are maintained at a predetermined temperature and under predetermined hydrogen pressure.

In the process of present invention, suitable alkylating agents known in the art may be used. However, the primary alkylating agents used are olefins. Use of olefins as alkylating agents have advantage of achieving alkylation of target molecule (i.e., alkane or aromatic) in a single step without the need of metal function in the catalyst. But the process requires very strong acidity, which makes the process cumbersome due to acid handling and storage issues. Other alkylating agent are selected from heteroatom containing compounds. Therefore, the alkylating agent in the present invention can be any alkyl-electrophiles generating agent from the functional group of hydroxyls, halides, thiols, oxy, but not limited to. The alkylating agent can also be generated in-situ using compound(s) that may react within the reactor system to generate alkyl-electrophiles.

In another embodiment of the present invention, the reactor and the catalyst system are maintained at the temperature suitable for caring out the reaction i.e., weighted average bed temperature (WABT) of catalyst bed is preferably maintained between 350 and 500° C., more preferably between 350 to 450° C. and most preferably between 380 and 430° C.

In one of the embodiment of the present invention, the benzene conversion reaction is carried out in hydrogen environment. The hydrogen partial pressure maintained in the reactor is preferably between 15-100 kg/cm$^2$ g more preferably between 25-75 kg/cm$^2$g and most preferably between 40-65 kg/cm$^2$g. Maintaining the hydrogen pressure in the reactor suppress coke formation and therefore reduces catalyst deactivation rate and increase catalyst life. The aromatic hydrogenation reactions are equilibrium controlled and the equilibrium is favored towards hydrogenation reaction at high pressure and low temperature. Since the operating conditions in the alkylation reactor is entirely opposite hence aromatic saturation reactions are not favored.

In yet another embodiment of the present invention, the weighted hourly space velocity (WHSV) of the process is preferably between of 0.5 and 5 h$^{-1}$, more preferably between 0.7 and 3 h$^{-1}$ and most preferably between 1 and 2 h$^{-1}$ and the hydrogen to hydrocarbon ratio (H$_2$/HC) is preferably between 300 and 1500 Nm$^3$/m$^3$, more preferably between 500 and 1200 Nm$^3$/m$^3$ and most preferably between 600 and 1000 Nm$^3$/m$^3$.

The catalyst of the present invention is dual functional and has both acidic and metal sites. The acidic function is imparted by virtue zeolite support and the hydrogenation-dehydrogenation function is imparted by metals selected from the group of VIB and VIIIB of periodic table. In the base catalyst the metal is impregnated over the support and present in oxide form. The metal site is active in elemental (zero-valent) form of sulfide form. Accordingly, the catalyst is activated either by reduction of metal site to elemental form using any suitable reducing agent or by converting the metal site to sulfide form using any suitable sulfiding agent.

In one of the embodiment of the present invention, the catalyst is comprises of the followings:
  a) a carrier comprising of Y-zeolite
  b) a binder comprising of alumina
  c) metals selected from the groups VIB and VIIIB of periodic table
  d) additive containing nitrogen and oxygen.

The Y-zeolite acts as the main acid function in the catalyst. The acid function is determined by the number of active sites and its strength. The extent of alkylation reaction highly depends upon the active site per unit area of the catalyst. However, active sites present in a particular type of zeolite are compensated by the strength of the available acid sites.

In another embodiment of the present invention, the alkylation function of the catalyst is promoted by the presence of the metal sites. The metals are selected from group VIB and VIIIB of the periodic table. The metals from group VIB are selected from a group consisting of molybdenum, tungsten, and salts and mixtures thereof. The source of tungsten comprises of salts selected from a group consisting of ammonium tungsten, tungsten trioxide, sodium tungstate, tungstic acid, phospo tungstic acid etc. The group VIIIB metals are selected from a group consisting of nickel, cobalt, and salts and mixtures thereof. The source of nickel salts is selected from a group consisting of nickel nitrate, nickel sulfate, nickel carbonate, nickel acetate, nickel chloride etc.

Yet another embodiment of the present invention the catalyst comprises of 15 to 25 wt % of the metal from VIB and metal from group VIIIB in the range 4 to 7 wt % of the total catalyst present. The metal site in the catalyst is activated to elemental form it is termed as reduced catalyst. The catalyst is activated to reduced catalyst using any suitable reducing agent known in the art and the most prominent reducing agent available in refinery and petrochemical complexes is hydrogen. Hydrogen is used as reducing agent, and the reduction is carried out preferably between 400 and 600° C. and most preferably between 450 and 550° C. Depending upon the exotherm, the purity and the flow rate of hydrogen gas can be controlled.

In another embodiment of the present invention, the metal site is activated to sulfide form, the catalyst is termed as sulfide catalyst. The use of sulfide catalyst is very common to the many refinery applications for hydro-desulfurization and hydrocracking processes. The metallic site from oxide-state is changed to sulfide-state by the use of sulfiding agents known in the art viz. $H_2S$, DMDS, etc.

In one of the embodiment of the present invention, the initial activity of catalyst in reduced form as well as in sulfide form is similar, however; the coke formation and deactivation rate of reduced catalyst is much greater compared to sulfided catalyst. Thus, the sulfide catalysts are more compatible for refinery-based benzene alkylation process. Further, with use of reduced catalyst the pressure drop starts developing within 4-5 days run and finally the feed stream needs to be cut off due to excessive pressure drop across the catalyst bed, whereas no such observation recorded with sulfided catalyst even after the continuous run of one month, which is good enough to understand the stability of sulfide catalyst.

Another, disadvantage of reduced catalyst is with respect to feed impurity. The reduced catalyst demand feed stream free from any hetero atom impurities, particularly sulphur and nitrogen. However, for sulfide catalyst the only impurity is Nitrogen. The nitrogen compound in the feed reacts with the acid site and deactivate them temporarily.

In another embodiment of the present invention, no prior desulfurization of feed stream is required. It is further disclosed that the process accommodates feed streams containing sulphur between 100 and 5000 ppmw, preferably between 100 and 2000 ppmw and more preferably between 100 and 500 ppmw. If the sulphur content in the feed stream is less than 100 ppmw, DMDS or any $H_2S$ generating agents can be doped along with the feed stream for maintaining sufficient $H_2S$ concentration in the reactor system for keeping the metal in sulfided form. Maintaining $H_2S$ concentration is vital for sulfided catalyst, otherwise catalyst will be permanently deactivated.

In another embodiment of the present invention, the nitrogen content of the hydrocarbon feed stream must be below 20 ppmw. If the feed stream contains 'N' more than 20 ppmw, pretreatment i.e., Hydro-denitrogentation (HDN) of feed is required. The HDN reaction is also associated with hydro-desulfurization (HDS) reaction, and both can be done together in a separate reactor prior to benzene conversion reactor. However, if the feed stream contains 'N' below 20 ppmw and the sulphur as mentioned in previous paragraphs, then no pretreatment is required and both HDS and the benzene conversion reaction will occur simultaneously in the alkylation reactor. This flexibility of process and catalyst design makes this innovation unique and easily implementable in refinery for benzene management.

In another embodiment of the present invention, the operating condition and the catalyst system for alkylation reactor is also favorable for hydrocracking as well as isomerization reactions. However, the hydrocracking rate is low for low boiling fractions. Since the feed steam is boiling between $C_5$ and 210° C., more preferably between $C_5$ to 160° C. and most preferably $C_5$ to 95° C., hence the cracking reaction will not be predominant. It is also known in the art that, the hydrocracking reaction rate is highest for aromatic and lowest for n-paraffin, hence cracking of aromatic side chains will be the more compared to hydrocracking of other molecules viz. naphthenes, iso-paraffins, n-paraffins and olefins. However, the isomerization of n-paraffins will enhance overall RON of the product stream.

In another embodiment of the present invention, the alkylation of other aromatics viz. $C_7$, $C_8$, $C_9$ and $C_{10}$ aromatics occurs simultaneously with benzene alkylation, however, due to hydrocracking environment and hydrocracking functionality of catalyst system the side ring cracking or cracking at alpha-carbon will restrict formation of higher aromatics. In the same embodiment it is disclosed that formation aromatics higher than $C_{10}$ is very limited. There is no major change in boiling range of reactor outlet product compared to feed stream. Similarly, the change in product density compared to feed stream density is also insignificant.

In yet another embodiment of the present invention, other type of reactions viz. disproportion of toluene molecule trans-alkylation of $C_9$ with toluene may also occur in the reactor.

In another embodiment of the present invention, RON of the product stream is at least 2 units more preferably 3 units and most preferably 5 units more than the feed steam. It is further disclosed that benzene content of the product stream is preferably less than 1 vol % and most preferably less than 0.5 vol %.

In another embodiment of the present invention, process configurations include fractionation of $C_6$ fraction from the reactor outlet product and re-circulating the said stream to alkylation reactor for further conversion of un-reacted benzene molecules.

The present process can be also applied for increasing xylene production, through conversion of benzene stream generated in aromatic complex to alkylated benzenes and re-circulating the same in the aromatic complex.

In yet another embodiment of the present invention, the conversion of the benzene is at least more than 70% more preferably more than 60% and most preferably more than 50%. However, with $C_6$ fraction recycle, the benzene conversion more than 95%, more preferably more than 90% and most preferably more than 85% can be achieved.

Description of FIG. 1:

FIG. 1 represent schematic process diagram of the subject invention. Feed containing benzene, methanol and DMDS have been introduced in the reactor 3 through line 1. Hydrogen is also added in the reactor through line 2. The reactor effluent coating converted and unconverted part of the hydrocarbon, process off gas and water is sent to a high-pressure separator (HPS) 5 through line 4. In the HPS, the water is settled in the bottom of the vessel and sent via line 8 to another separator 10 operated at lower temperature and called Cold High-Pressure Separator (CHPS). However, the effluent hydrocarbon from HPS is sent through line 7 to another separator 13 operated at lower pressure and temperature and called Low Pressure Separator (LPS). The condensed hydrocarbons from low temperature of the CHPS via line 12 are mixed with line 7. The unutilized hydrogen gas is separated in HPS and taken out of the system through line 6 and recycled back in the reactor. The process off gas is separated in the LPS and taken out of the system through line 14 and through line-9 from the CUPS. The product water is separated from the CUPS through line-11 and the product is taken out through line 15.

Example-1

Experiment conducted in a fixed bed micro flow unit (MFU). The feed containing pure benzene and pure methanol and DMDS of 2.5 wt % of the total hydrocarbon feed in brought into contact with catalyst in the reactor. Methanol and benzene ratio in the feedstock maintained at 11:9 (wt:wt). Hydrogen is also added in the reactor. The WABT of the reactor is 390° C., whereas the pressure of the reactor maintained at 50 barg. The LHSV of the liquid stream in the reactor is 2 h$^{-1}$. The H$_2$/HC ratio of the experiment is 500 Nm$^3$/m$^3$. The hydrocarbon product properties are given in the Table-1.

TABLE 1

Hydrocarbon product properties

| Hydrocarbon Type (PIONA Analysis) | Unit | Values |
|---|---|---|
| n-paraffins | wt % | 0 |
| i-paraffins | | 1 |
| Naphthenes | | 1 |
| Benzene | | 89.5 |
| Toluene | | 5.5 |
| Xylene/EB | | 1.5 |
| Others | | 1.5 |
| Total | | 100 |
| Conversion | % | 10.5 |
| (C7 + C8) selectivity | % | 66.7 |

Example-2

For the experiment the feed composition is same as described in Example-1. The WABT of the reactor is 420° C., whereas the pressure of the reactor maintained at 50 barg. The LHSV of the liquid stream in the reactor is 1 h$^{-1}$. The H$_2$/HC ratio of the experiment is 1000 Nm$^3$/m$^3$. The hydrocarbon product properties are given in the Table-2.

TABLE 2

Hydrocarbon product properties

| Hydrocarbon Type (PIONA Analysis) | Unit | Values |
|---|---|---|
| n-paraffins | wt % | 1.86 |
| i-paraffins | | 4.75 |
| Naphthenes | | 3.55 |
| Benzene | | 37.96 |
| Toluene | | 20.48 |
| Xylene/EB | | 17.87 |
| Others | | 13.53 |
| Total | | 100 |
| Conversion | % | 62.04 |
| (C7 + C8) selectivity | % | 61.8 |

Example-3

In the experiment, the WABT increased to 440° C. However, the feed composition remains same. The pressure of the reactor maintained at 50 barg. The LHSV of the liquid stream in the reactor is 1 h$^{-1}$. The H$_2$/HC ratio of the experiment is 1000 Nm$^3$/m$^3$. The hydrocarbon product properties are given in the Table-3.

TABLE 3

Hydrocarbon product properties

| Hydrocarbon Type (PIONA Analysis) | Unit | Values |
|---|---|---|
| n-paraffins | wt % | 1.31 |
| i-paraffins | | 1.98 |
| Naphthenes | | 1.95 |
| Benzene | | 52.61 |
| Toluene | | 20.46 |
| Xylene/EB | | 13.13 |
| Others | | 8.56 |
| Total | | 100 |
| Conversion | % | 47.39 |
| (C7 + C8) selectivity | % | 70.9 |

The distinct advantages of the present process are:
i. It can process any refinery stream with benzene content more than 5 vol %
ii. process has no restriction with respect to feed sulphur or H$_2$S.
iii. process can be utilized simultaneously for hydrodesulfurization and benzene conversion
iv. process has been developed considering the refinery constrains and can be utilized for both benzene management as well as production of petrochemical (aromatic complex) feedstock.

We claim:

1. A process for controlling a percentage of benzene in a hydrocarbon feed stream comprising benzene, the process comprising:
   mixing the hydrocarbon feed stream with an alkylating agent and a sulfiding agent to obtain a mixed hydrocarbon feed stream; and
   routing the mixed hydrocarbon feed stream and hydrogen gas to pass over a catalyst in a catalytic reactor to obtain a processed hydrocarbon stream, wherein the catalyst comprises 15-25 wt % of group VIB metals and 4-7 wt % of group VIIIB metals, and wherein the process converts benzene into higher alkylated aromatic molecules and simultaneously results in hydrodesulfurization of the hydrocarbon feed stream in the catalytic reactor.

2. The process as claimed in claim 1, wherein the benzene content in the hydrocarbon feed stream is ≥5 vol %.

3. The process as claimed in claim 1, wherein the hydrocarbon feed stream comprises a sulphur compound.

4. The process as claimed in claim 1, wherein the catalytic reactor is selected from the group consisting of a fixed bed plug flow reactor, a continuous stirred tank reactor, a batch reactor, and a semi batch reactor.

5. The process as claimed in claim 1, wherein the catalytic reactor is maintained at a weighted average bed temperature (WABT) of catalyst bed of 350-500° C.

6. The process as claimed in claim 1, wherein the catalytic reactor is maintained at a hydrogen partial pressure of 15-100 kg/cm$^2$ g.

7. The process as claimed in claim 1, wherein the hydrogen gas to hydrocarbon ratio (H$_2$/HC) is in a range of 300-1500 Nm$^3$/m$^3$.

8. The process as claimed in claim 1, wherein the catalyst is a dual functional catalyst with an acidic and a hydrogenation-dehydrogenation function, wherein the acidic function is imparted by virtue of a zeolite support and the hydrogenation-dehydrogenation function is imparted by metals selected from the group VIB and the group VIIIB.

9. The process as claimed in claim 1, wherein the catalyst comprises: a) a carrier comprising Y-zeolite; b) a binder comprising alumina; c) metals selected from the groups VIB and VIIIB; and d) an additive containing nitrogen and oxygen.

10. The process as claimed in claim 9, wherein the group VIB metals are selected from the group consisting of molybdenum, tungsten, and salts and mixtures thereof, and the group VIIIB metals are selected from the group consisting of nickel, cobalt, and salts and mixtures thereof.

11. The process as claimed in claim 1, wherein the hydrocarbon feed stream is not desulfurized; and the nitrogen content in the hydrocarbon feed stream is below 20 ppmw.

12. The process as claimed in claim 1, wherein the alkylating agent is selected from the group consisting of olefins and alkyl-electrophiles generating agents, wherein the alkyl-electrophiles generating agents comprise a functional group of hydroxyls, halides, thiols, or oxy; and wherein the sulfiding agent is selected from the group consisting of $H_2S$ and Dimethyl Disulfide (DMDS).

13. The process as claimed in claim 1, further comprising generating the alkylating agent in-situ using compound(s) that-react within the catalytic reactor.

14. The process as claimed in claim 1, wherein the processed hydrocarbon stream has a RON at of least 2 units more than the hydrocarbon feed stream; and the benzene content in the processed hydrocarbon stream is ≤0.5 vol %.

15. The process as claimed in claim 1 comprising:
 a. routing the hydrocarbon feed stream with the alkylating agent, the sulfiding agent, and the hydrogen gas to the catalytic reactor to pass over the catalyst to produce a catalytic reactor effluent;
 b. routing the catalytic reactor effluent to a high-pressure separator (HPS) and routing water settled at a bottom of the HPS to a cold high-pressure separator (CHPS);
 c. routing an effluent hydrocarbon from the HPS to a low-pressure separator (LPS),
 d. routing and mixing condensed hydrocarbons of the CHPS with the effluent hydrocarbon from the; and
 e. separating water from the CHPS and obtaining a product from the LPS, wherein CHPS is operated at a lower temperature relative to the HPS and the LPS is operated at a lower pressure and a temperature relative to the HPS.

16. The process as claimed as claimed 15, wherein an unutilized hydrogen gas is separated in the HPS and removed and recycled back to the catalytic reactor.

17. The process as claimed as claimed 15, wherein off gases are separated from the LPS, and from the CHPS.

* * * * *